United States Patent
Kaplan et al.

(10) Patent No.: US 6,235,422 B1
(45) Date of Patent: May 22, 2001

(54) BATTERY

(75) Inventors: Alexander Kaplan, Providence, RI (US); Sean A. Sargeant, Westford, MA (US); Viet H. Vu, Medway, MA (US); Douglas Woodnorth, Needham, MA (US)

(73) Assignee: The Gillette Company, Boston, MA (US)

( * ) Notice: Subject to any disclaimer, the term of this patent is extended or adjusted under 35 U.S.C. 154(b) by 0 days.

(21) Appl. No.: 09/321,930

(22) Filed: May 28, 1999

(51) Int. Cl.[7] .............................. H01M 2/00; H01M 2/26
(52) U.S. Cl. ....................... 429/161; 429/185; 429/165
(58) Field of Search ..................... 29/150–161, 164–169, 29/171, 174, 185

(56) References Cited

U.S. PATENT DOCUMENTS

| | | | |
|---|---|---|---|
| 3,043,899 | * | 7/1962 | Coleman ............................ 136/108 |
| 4,011,369 | * | 3/1977 | Sundberg ........................... 429/140 |
| 4,977,043 | * | 12/1990 | Kadouchi et al. .................... 429/54 |
| 5,948,561 | * | 9/1999 | Urry .................................. 429/164 |

FOREIGN PATENT DOCUMENTS

| | | |
|---|---|---|
| 431 881 | 7/1926 | (DE) . |
| 1 496 208 | 5/1970 | (DE) . |
| 195 02 594 A1 | 8/1995 | (DE) . |
| 2 625 372 | 6/1989 | (FR) . |
| 2-295063 | 12/1990 | (JP) . |
| 7-326347 | 12/1995 | (JP) . |
| 7-326370 | 12/1995 | (JP) . |
| WO 00/01022 | 1/2000 | (WO) . |
| WO 00/30196 | 5/2000 | (WO) . |

* cited by examiner

Primary Examiner—Carol Chaney
(74) Attorney, Agent, or Firm—Fish & Richardson P.C.

(57) ABSTRACT

A battery includes a housing, a first electrode, a second electrode having a plurality of cavities within the first electrode, a separator between each cavity and the first electrode, a seal positioned above the first electrode and the cavity, and a current collector. The current collector includes a member passing through the seal, a prong extending into each cavity, and a branch member connecting each prong to the member beneath the seal.

35 Claims, 3 Drawing Sheets

BATTERY

BACKGROUND OF THE INVENTION

This invention relates to batteries.

Batteries, such as alkaline batters, are commonly used as energy sources. Generally, alkaline batteries include a cathode, an anode, a separator, and an electrolytic solution. The cathode is typically formed of an active material (e.g., manganese dioxide), carbon particles, and a binder. The anode can be a gel including an active material (e.g., zinc particles). The separator is usually disposed between the cathode and the anode. The electrolytic solution, which is dispersed throughout the battery, can be a hydroxide solution.

Alkaline batteries include the conventional AA, AAA, AAAA, C, and D batteries commonly sold in stores. These conventional alkaline batteries include a cylindrical housing containing a central, cylindrical zinc gel anode surrounded by a ring-shaped manganese dioxide cathode.

These conventional batteries include a negative end and a positive end. The negative end connects with a current collector inside the housing that includes a prong extending into the anode. A seal is typically positioned above the anode and cathode to prevent anode material and cathode material from leaking. The prong of the current collector passes through the seal and then into the anode.

Mick et al., U.S. Pat. No. 5,869,205 ("the Mick patent") describes a battery which has an enhanced "service performance" (i.e., a longer life). According to Mick, the service performance in conventional alkaline batteries is limited by the restricted "anode-to-cathode interface area" in the alkaline batteries. The Mick patent gets around this restriction by replacing the center cylindrical cavity that, for example, is the zinc anode in conventional alkaline batteries with a plurality of cylindrical cavities that together make up the anode. By replacing, for example, a central zinc anode with a zinc anode including multiple cavities, the interface area between the zinc anode and the cathode is increased, providing the enhanced service performance.

The battery described by Mick including a zinc anode having multiple cavities also includes a negative end, a current collector connected to the negative end, and a seal positioned above the anode and cathode to prevent anode and cathode material from leaking. The current collector includes a prong extending into each anode cavity and also through the seal. This means that the seal in the battery is pierced multiple times. The prongs then bend and connect at a central location above the seal.

SUMMARY OF THE INVENTION

The invention features a battery including a housing containing a first electrode, a second electrode having a plurality of cavities within the first electrode, a separator disposed between the first electrode and each of the cavities, a seal positioned above the first and second electrode, and a current collector. Significantly, although the current collector includes a prong extending into each cavity, the prongs connect to a single member through branch members beneath the seal. The member then passes through the seal and connects with the negative end of the battery. As a result, although the battery includes a multi-cavity electrode and a current collector with a prong extending into each cavity, the current collector only pierces the seal once, thus providing minimal opportunity for leakage of electrode material.

Preferably, the battery further includes a second seal positioned between the branch members and the first electrode to prevent inadvertent contact.

In a preferred embodiment, the first electrode is a cathode including manganese dioxide and the second electrode is an anode including zinc. The second electrode may include, for example, two, three, or four cavities. In one preferred embodiment, the second electrode includes two D-shaped cavities. The battery may be, for example, an AA, AAA, AAAA, C, or D battery.

In some preferred embodiments, the battery has a length and, at some position along the length of the battery, each of the cavities is a minimum distance ($d_1$) from the housing and a minimum distance ($d_2$) from each of the other cavities, with each ratio $d_2$:$d_1$ for each cavity being between 1.5:1 and 2.5:1, preferably between 1.7:1 and 2.3:1, more preferably between 1.8:1 and 2.2:1, and most preferably between 1.9:1 and 2.1:1. The ratio can be determined, for example, at the mid-point along the length of the battery, or a third of the distance along the length of the battery, or two-thirds of the distance along the length of the battery. Preferably, at least 50 percent of, more preferably at least 75 percent of, and most preferably substantially the entire outer circumference of each cavity at that position fulfills this relationship. The housing preferably is cylindrical.

The minimum distance ($d_1$) between a cavity and the housing can be measured by determining the minimum distance between a surface of the first electrode adjacent the cavity and a surface of the first electrode adjacent the housing. The minimum distance ($d_2$) between two cavities is measured at the same position along the length of the battery by determining the minimum distance between a surface of the first electrode adjacent one cavity and a surface of the first electrode adjacent the second cavity.

Preferably, the ratio $d_2$:$d_1$ for each cavity is an average of between 1.5:1 and 2.5:1, more preferably between 1.7:1 and 2.3:1, and most preferably between 1.8:1 and 2.2:1 or even between 1.9:1 and 2.1:1.

The invention also features a battery in which the second electrode is only a single cavity. In this battery, the current collector includes a plurality of prongs extending into the single cavity.

Other features and embodiments of the invention will be apparent from the description of the preferred embodiment thereof, and from the claims.

DESCRIPTION OF THE PREFERRED EMBODIMENTS

Figure 1:
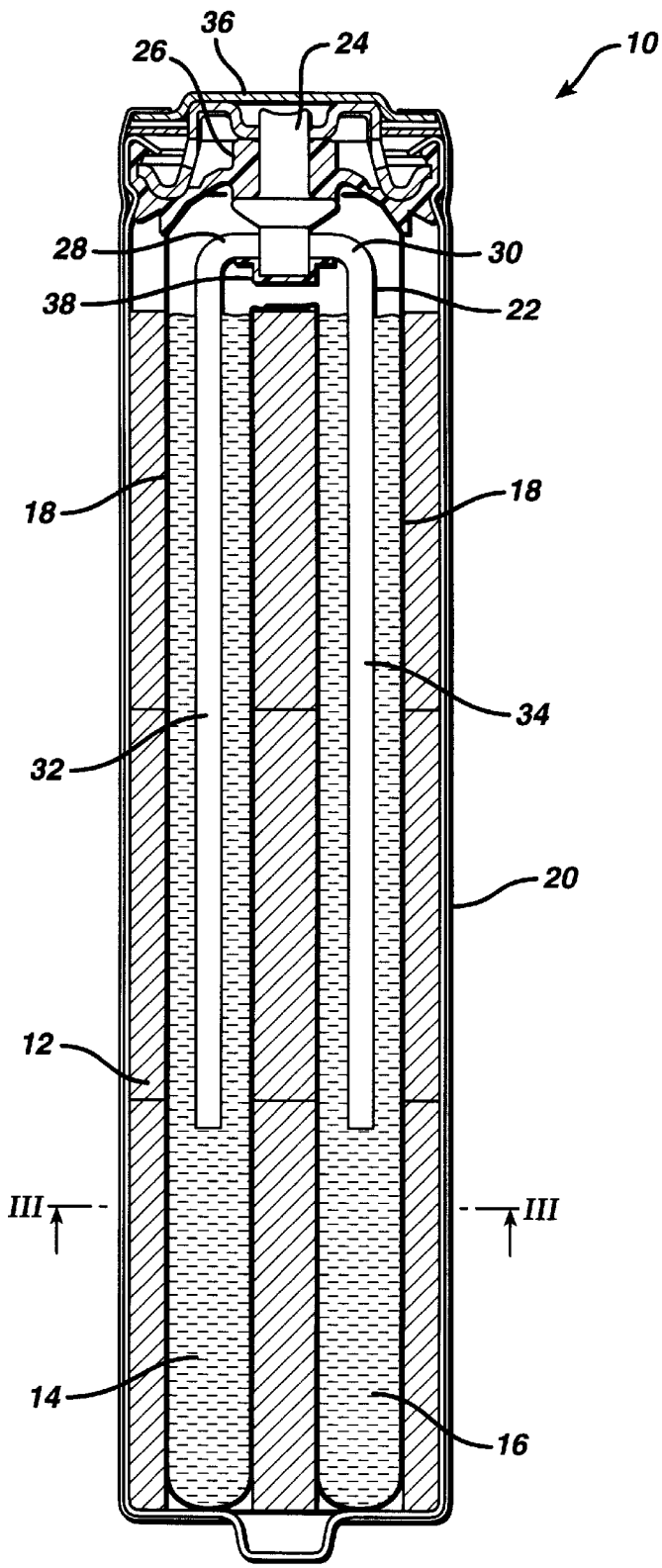
FIG. 1 is a side-sectional view of a battery.
Figure 2:
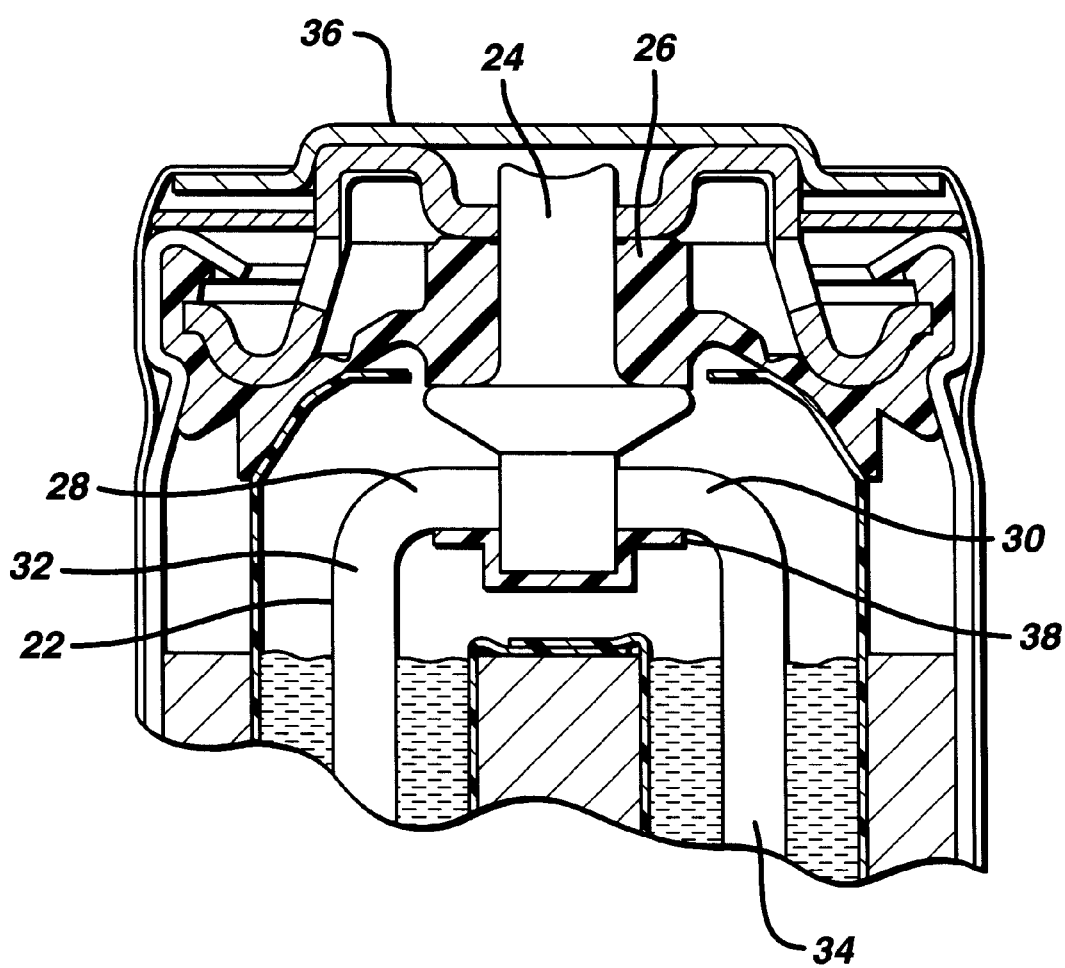
FIG. 2 is an enlarged view of the top portion of the battery in FIG. 1.
Figure 3:
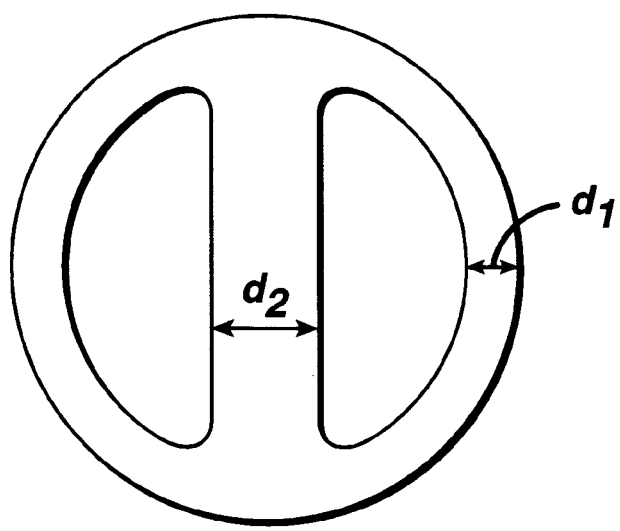
FIG. 3 is a cross-sectional view of the battery in FIG. 1, taken at III—III in FIG. 1.

Referring to FIGS. 1–3, battery 10 includes a cathode 12, an anode consisting of two generally D-shaped cavities 14 and 16, separators 18, and cylindrical housing 20. Battery 10 also includes a current collector 21 that has a member 24 passing through seal 26. Current collector 22 further includes branch members 28 and 30 connecting to prongs 32 and 34, respectively. Prongs 32 and 34 extend into anode cavities 14 and 16, respectively. The end of member 24 is connected to negative metal top cap 36, which serves as the negative terminal for the battery. The cathode is in contact with the housing, and the positive terminal of the battery is at the opposite end of the battery from the negative terminal. Battery 10 also includes a second seal, or insulator 38, positioned between the components of current collector 22 below seal 26 and cathode 12. An electrolytic solution is dispersed throughout battery 10.

Cathode 12 includes manganese dioxide, carbon particles, and a binder.

Any of the conventional forms of manganese dioxide used for cathodes can be used. The preferred manganese dioxide is EMD, although CMD can also be used. Distributors of such manganese dioxides include Kerr McGee, Co. (Trona D), Chem Metals, Co., Tosoh, Delta Manganese, Mitsui Chemicals and JMC. Generally, the cathode will include between 80% and 88% of manganese dioxide by weight.

The carbon particles also can be any of the conventional carbon particles used in cathodes. They can be synthetic or nonsynthetic, and they can be expanded or nonexpanded. In certain embodiments, the carbon particles are nonsynthetic, nonexpanded graphite particles. In these embodiments, the graphite particles preferably have an average particle size of less than about 20 microns, more preferably from about 2 microns to about 12 microns, and most preferably from about 5 microns to about 9 microns as measured using a Sympatec HELIOS analyzer. Nonsynthetic, nonexpanded graphite particles can be obtained from, for example, Brazilian Nacional de Grafite (Itapecirica, MG Brazil (MP-0702X). Generally, the cathode will include between 5% and 8% of carbon particles by weight.

Examples of binders include polyethylene powders, polyacrylamides, Portland cement and fluorocarbon resins, such as PVDF and PTFE. An example of a polyethylene binder is sold under the tradename Coathylene HA-1681 (Hoescht). Generally, the cathode includes between 0.1 percent to about 1 percent of binder by weight.

Cathode 12 can include other additives. Examples of these additives are disclosed in U.S. Pat. No. 5,342,712, which is hereby incorporated by reference. Cathode 12 may include, for example, from about 0.2 weight percent to about 2 percent $TiO_2$ weight.

The electrolyte solution also is dispersed through cathode 12, and the weight percentages provided above are determined after the electrolyte solution has been dispersed.

The anode can be formed of any of the standard zinc materials used in battery anodes. For example, anode 14 can be a zinc gel that includes zinc metal particles, a gelling agent and minor amounts of additives, such as gassing inhibitor. In addition, a portion of the electrolyte solution is dispersed throughout the anode.

The zinc particles can be any of the zinc particles conventionally used in gel anodes. Other examples of zinc particles used in the anode include these described in U.S. Ser. No. 08/905,254. U.S. Ser. No. 09/115,867. and U.S. Ser. No. 09/156,915, which are assigned to the assignee in the present application and are hereby incorporated by reference. Generally, the anode includes between 67% and 71% of zinc particles by weight.

Gelling agents that can be used in anode 14 include polyacrylic acids, grafted starch materials, salts of polyacrylic acids, polyacrylates, carboxymethylcellulose or combinations thereof. Examples of such polyacrylic acids are Carbopol 940 and 934 (B. F. Goodrich) and Polygel 4P (3V), and an example of a grafted starch material is Waterlock A221 (Grain Processing Corporation, Muscatine, Iowa). An example of a salt of a polyacrylic acid is Alcosorb G1, (Ciba Specialties). The anode generally includes from 0.1 percent to about 1 percent gelling agent by weight. These weight percentages correspond to when the electrolytic solution is dispersed throughout the anode.

Gassing inhibitors can be inorganic materials, such as bismuth, tin, lead and indium. Alternatively, gassing inhibitors can be organic compounds, such as phosphate esters, ionic surfactants or nonionic surfactants. Examples of ionic surfactants are disclosed in, for example, U.S. Pat. No. 4,777,100, which is hereby incorporated by reference.

Separators 18 can have any of the conventional designs for battery separators. In some embodiments, separators 18 can be formed of two layers of nonwoven, non-membrane material with one layer being disposed along a surface of the other. To minimize the volume of separators 18 while providing an efficient battery, each layer of nonwoven, non-membrane material can have a basis weight of about 54 grams per square meter, a thickness of about 5.4 mils when dry and a thickness of about 10 mils when wet. In these embodiments, the separator preferably does not include a layer of membrane material or a layer of adhesive between the nonwoven, non-membrane layers. Generally, the layers can be substantially devoid of fillers, such as inorganic particles.

In other embodiments, separators 18 include an outer layer of cellophane with a layer of nonwoven material. The separator also includes an additional layer of nonwoven material. The cellophane layer can be adjacent cathode 12 or the anode. Preferably, the nonwoven material contains from about 78 weight percent to about 82 weight percent PVA and from about 18 weight percent to about 22 weight percent rayon with a trace of surfactant. Such nonwoven materials are available from PDM under the tradename PA36.

The electrolytic solution dispersed throughout battery 10 can be any of the conventional electrolytic solutions used in batteries. Typically, the electrolytic solution is an aqueous hydroxide solution. Such aqueous hydroxide solutions include potassium hydroxide solutions including, for example, between 33% and 38% by weight percent potassium hydroxide and sodium hydroxide solutions.

Housing 20 can be any conventional housing commonly used in primary alkaline batteries. The housing typically includes an inner metal wall and an outer electrically non-conductive material such as heat shrinkable plastic. Optionally, a layer of conductive material can be disposed between the inner wall and the cathode 12. This layer may be disposed along the inner surface of wall, along the outer circumference of cathode 12 or both. This conductive layer can be formed, for example, of a carbonaceous material. Such materials include LB1000 (Timcal), Eccocoat 257 (W. R. Grace & Co.), Electrodag 109 (Acheson Industries, Inc.), Electrodag 112 (Acheson) and EB0005 (Acheson). Methods of applying the conductive layer are disclosed in, for example, Canadian Patent No. 1,263,697, which is hereby incorporated by reference.

Current collector 24 is made from a suitable metal, such as brass. Seals 26 and 38 can be made, for example, of nylon.

An example of battery 10 can be prepared as follows. A cathode mixture is prepared by combining 85.5% EMD (from Kerr McGee), 7.3% graphite (Coathylene HA1681 from Hoechst), 0.3% polyethylene binder (MP-0702X from Nacional de Graphite), and 6.9% electrolyte solution. The mixture then is compressed under pressure in a die slotted into a two "D" cavity. The formed pellet was attracted out of the die by a counter punch. Four pellets (for a AA battery) or three pellets (for a AAA battery) were aligned vertically by half-moon mandrels and slipped into the housing and then recompacted inside the housing to make contact with the housing. The separator (P.G.I. Nonwoven 7638) is placed within each cavity. An anode mixture was prepared by combining (in weight percentages) 70% zinc powder (Zinc Corp. of America 1216), a gelling agent (Carbopol 940 from B F Goodrich), and 30% electrolyte (composed of 98.6% liquid electrolyte and 1.4% of the dissolved gelling agent). The anode mixture then was dispersed into the cavities. The top assembly including top cap 28, the current collector, and seal 26, was placed over the housing and mechanically crimped over to seal the battery. A sealant (Spec Seal), was applied to the side of the housing prior to the assembly.

In battery 10, anode cavities 14 and 16 are positioned equal distances ($d_1$) from housing 20 and equal distances ($d_2$) from each other. The ratio of $d_2$:$d_1$ is approximately 2:1 around the entire circumference of each cavity. During use of battery 10, the cathode material closest to the anode cavities will be consumed first, and over time areas of consumed cathode material form around each cavity. Because $d_2$ is approximately twice $d_1$, as the area of consumed cathode material expands it will tend to reach housing 20 and the area of consumed cathode material expanding from the other cavity after approximately the same time. As a result, the efficiency of consumption of the cathode material is maximized, thus increasing the life of the battery.

Other embodiments are within the claims. For example, the anode can comprise three or four triangle-shaped cavities as described in U.S. Ser. No. 09/322,832, which is being filed on the same day as this application, and is owned by the same owner as the present application and hereby is incorporated by reference. In these embodiments, the current collect may include three or four branch members connecting to prongs extending into each cavity.

In addition, the positions of the cathode and may be reversed.

The branch members (e.g., 28 and 30) of the current collector optionally may be designed so that they lock that snaps as a unit, onto the member passing through the seal (e.g., member 24).

What is claimed is:

1. A battery comprising:
    a housing;
    a first electrode within the housing;
    a second electrode comprising a plurality of cavities including an electrode-active material and surrounded, in cross-section, by the first electrode;
    a separator between each of the cavities and the first electrode;
    a seal that prevents leakage positioned above the first electrode and the cavities; and
    a current collector comprising
        a member passing through the seal,
        a plurality of prongs, each of the prongs extending into one of the cavities, and
        a plurality of branch members, each of the branch members connecting at least one of the prongs to the member beneath the seal.

2. The battery of claim 1, further comprising a second seal positioned between the branch members and the first electrode.

3. The battery of claim 1, wherein the second electrode consists of two cavities including the electrode-active material.

4. The battery of claim 3, wherein the cavities are D-shaped.

5. The battery of claim 1, wherein the second electrode comprises three cavities including the electrode-active material.

6. The battery of claim 1, wherein the second electrode comprises four cavities including the electrode-active material.

7. The battery of claim 1, wherein the first electrode is a cathode.

8. The battery of claim 7, wherein the cathode comprises manganese dioxide.

9. The battery of claim 8, wherein the second electrode is an anode comprising zinc.

10. The battery of claim 7, wherein the second electrode is an anode comprising zinc.

11. The battery of claim 1, wherein each of the cavities is triangle-shaped.

12. The battery of claim 1, wherein each of the cavities is cylindrically shaped.

13. The battery of claim 1, wherein the battery is a AA battery.

14. The battery of claim 1, wherein the battery is a AAA battery.

15. The battery of claim 1, wherein the battery is a AAAA battery.

16. The battery of claim 1, wherein the battery is a C battery.

17. The battery of claim 1, wherein the battery is a D battery.

18. The battery of claims 1 or 2, wherein the housing is cylindrical.

19. The battery of claim 1, wherein the plurality of branch members connect to the vertical member through a lock that snaps.

20. A battery comprising:
    a housing;
    a first electrode within the housing;
    a second electrode surrounded, in cross-section, by the first electrode;
    a separator between the first electrode and the second electrode;
    a seal positioned above the first electrode and the second electrode; and
    a current collector comprising
        a member passing through the seal,
        a plurality of prongs
        a plurality of branch members, each of the branch members connecting a prong to the member beneath the seal.

21. The battery of claim 19, further comprising a second seal positioned between the branch members and the first electrode.

22. The battery of claim 20, wherein the first electrode is a cathode.

23. The battery of claim 22, wherein the cathode comprises manganese dioxide.

24. The battery of claim 23, wherein the second electrode is an anode comprising zinc.

25. The battery of claim 20, wherein the second electrode is an anode.

26. The battery of claim 20, wherein the battery is selected from the group consisting of AA, AAA, AAAA, C, and D batteries.

27. The battery of claim 20, wherein the housing is cylindrical.

28. The battery of claim 20, wherein the plurality of branch members connect to the vertical member through a lock that snaps.

29. A battery comprising:
    a housing;

a first electrode within the housing;

a second electrode comprising a plurality of cavities, including an electrode-active material, within the first electrode;

a separator between each of the cavities and the first electrode;

a first seal that prevents leakage positioned above the first electrode and the cavities;

a second seal positioned between the branch members and the first electrode; and a current collector comprising
   a member passing through the first seal,
   a plurality of prongs, each of the prongs extending into one of the cavities, and
   a plurality of branch members, each of the branch members connecting at least one of the prongs to the member beneath the first seal.

30. The battery of claim 29, wherein the first electrode is a cathode.

31. The battery of claim 30, wherein the cathode comprises manganese dioxide.

32. The battery of claims 29, 30, or 31, wherein the second electrode includes zinc as the active electrode material.

33. A battery comprising a housing;

a cathode comprising a plurality of cavities, including an anode-active material comprising zinc, within the cathode;

a separator between each of the cavities and the cathode;

a seal that prevents leakage positioned above the cathode and the cavities; and a current collector comprising
   a member passing through the seal,
   a plurality of prongs, each of the prongs extending into one of the cavities, and
   a plurality of branch members, each of the branch members connecting at least one of the prongs to the member beneath the seal.

34. The battery of claim 33, wherein the cathode comprises manganese dioxide.

35. A battery comprising a housing;

a cathode comprising manganese dioxide within the housing;

an anode, comprising a plurality of cavities within the cathode including an anode-active material;

a separator between each of the cavities and the cathode;

a seal that prevents leakage positioned above the cathode and the cavities; and a current collector comprising
   a member passing through the seal,
   a plurality of prongs, each of the prongs extending into one of the cavities, and
   a plurality of branch members, each of the branch members connecting at least one of the prongs to the member beneath the seal.

* * * * *

UNITED STATES PATENT AND TRADEMARK OFFICE
CERTIFICATE OF CORRECTION

PATENT NO. : 6,235,422 B1
DATED : May 22, 2001
INVENTOR(S) : Alexander Kaplan et al.

It is certified that error appears in the above-identified patent and that said Letters Patent is hereby corrected as shown below:

<u>Title page,</u>
Item [56], References Cited, U.S. PATENT DOCUMENTS, insert:
-- 4,360,575   11/23/82   Brennan
   4,318,968   03/09/82   Berger et al.
   4,283,470   08/11/81   Freeman et al.
   4,281,046   07/28/81   Davis, Jr. --

Signed and Sealed this

Fourteenth Day of September, 2004

JON W. DUDAS
*Director of the United States Patent and Trademark Office*